(12) United States Patent
Diez-Garias et al.

(10) Patent No.: US 12,269,060 B2
(45) Date of Patent: Apr. 8, 2025

(54) ELECTROOSMOTIC HIGH FIDELITY ACOUSTIC TRANSDUCER

(71) Applicant: Rutgers, The State University of New Jersey, New Brunswick, NJ (US)

(72) Inventors: Francisco J. Diez-Garias, Bridgewater, NJ (US); Thomas E. Hansen, Newport, RI (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 971 days.

(21) Appl. No.: 17/277,056

(22) PCT Filed: Jul. 17, 2019

(86) PCT No.: PCT/US2019/042191
§ 371 (c)(1),
(2) Date: Mar. 17, 2021

(87) PCT Pub. No.: WO2020/060664
PCT Pub. Date: Mar. 26, 2020

(65) Prior Publication Data
US 2022/0032340 A1 Feb. 3, 2022

Related U.S. Application Data

(60) Provisional application No. 62/732,164, filed on Sep. 17, 2018.

(51) Int. Cl.
*B06B 1/02* (2006.01)
*G01N 27/44* (2006.01)
(Continued)

(52) U.S. Cl.
CPC ......... *B06B 1/02* (2013.01); *G01N 27/44791* (2013.01); *G01N 29/02* (2013.01); *G01S 7/521* (2013.01); *G10K 11/00* (2013.01)

(58) Field of Classification Search
CPC .. B06B 1/02; B06B 1/06; B06B 1/0603; B06B 1/0607; B06B 1/0622;
(Continued)

(56) References Cited

U.S. PATENT DOCUMENTS 3,382,841 A * 5/1968 Bouyoucos ............ G10K 13/00
181/402
4,107,660 A * 8/1978 Chleboun .......... G08B 13/1663
367/21
(Continued)

FOREIGN PATENT DOCUMENTS

WO WO-2013173754 A1 * 11/2013 ......... G01N 27/4146

OTHER PUBLICATIONS

Kiyasatfar; Particle manipulation via integration of electroosmotic flow of power-law fluids with standing surface acoustic waves (SSAW) (Year: 2018).*

Primary Examiner — Daniel L Murphy
Assistant Examiner — Amie M Ndure
(74) Attorney, Agent, or Firm — FOX ROTHSCHILD LLP

(57) ABSTRACT

An acoustic transducer system for projecting and sensing acoustic waves or sound in fluid is disclosed in accordance with the present disclosure and figures herein. The system includes a transducer array of a plurality of channels, each channel having an inlet and an outlet, and a reservoir containing a liquid solution. A first electrode is disposed proximate to the inlet and a second electrode is disposed proximate to the outlet. A voltage source, connected to the first and second electrodes, is configured to apply voltage across a length of the array of the channels to generate an electric field parallel to each channel. The electric field causes an electroosmotic flow of ions from the reservoir to the outlet, producing a plurality of acoustic waves or sound at the outlet. A method for projecting and sensing acoustic
(Continued)

waves or sound in fluid using the acoustic transducer system is also disclosed herein.

20 Claims, 9 Drawing Sheets

(51) Int. Cl.
  *G01N 27/447* (2006.01)
  *G01N 29/02* (2006.01)
  *G01S 7/521* (2006.01)
  *G10K 11/00* (2006.01)
(58) Field of Classification Search
  CPC ... B06B 1/0625; B06B 1/0629; B06B 1/0688; B06B 1/0692; G01N 29/02; G01N 27/44791; G10K 11/00; G01S 7/521
  See application file for complete search history.

(56) References Cited

U.S. PATENT DOCUMENTS

| | | | | |
|---|---|---|---|---|
| 5,226,076 A * | 7/1993 | Baumhauer, Jr. | ........ | H04M 1/19 381/357 |
| 6,482,306 B1 * | 11/2002 | Yager | ........ | B01F 33/05 204/600 |
| 6,770,183 B1 * | 8/2004 | Hencken | ........ | F04B 19/006 204/600 |
| 6,781,284 B1 * | 8/2004 | Pelrine | ........ | F04B 43/043 310/330 |
| 7,612,358 B2 * | 11/2009 | Joo | ........ | B82Y 10/00 438/102 |
| 7,976,779 B2 * | 7/2011 | Tai | ........ | G01N 30/7266 204/600 |
| 8,331,197 B2 * | 12/2012 | Stytsenko | ........ | G10K 11/32 367/138 |
| 9,457,379 B2 * | 10/2016 | Amm | ........ | G01S 15/74 |
| 9,574,220 B2 * | 2/2017 | Eckhardt | ........ | C07D 311/16 |
| 9,660,170 B2 * | 5/2017 | Hajati | ........ | H10N 30/802 |
| 2002/0084510 A1 * | 7/2002 | Jun | ........ | B81C 1/00119 438/383 |
| 2004/0232807 A1 * | 11/2004 | Pelrine | ........ | F04B 43/043 310/330 |
| 2010/0200092 A1 * | 8/2010 | Beltram | ........ | F04B 43/046 137/828 |
| 2011/0063951 A1 * | 3/2011 | Jiang | ........ | G10K 15/04 977/902 |
| 2013/0051179 A1 * | 2/2013 | Hong | ........ | B06B 1/02 228/101 |
| 2014/0117812 A1 * | 5/2014 | Hajati | ........ | B06B 1/0622 310/314 |
| 2015/0034486 A1 * | 2/2015 | Sugioka | ........ | B01F 33/3032 204/600 |
| 2017/0216883 A1 * | 8/2017 | Hajati | ........ | B06B 1/0276 |
| 2017/0225196 A1 * | 8/2017 | Rothberg | ........ | G10K 11/18 |
| 2017/0322291 A1 * | 11/2017 | Salvia | ........ | G06V 40/1359 |
| 2018/0095067 A1 * | 4/2018 | Huff | ........ | G01N 33/48721 |
| 2018/0259643 A1 * | 9/2018 | Kim | ........ | G01S 15/06 |
| 2020/0175957 A1 * | 6/2020 | Hashida | ........ | B06B 1/02 |

* cited by examiner

Prototype: testing platform
Prototype 1: testing platform for membranes

| Membrane | Pore µm | Thick µm |
|---|---|---|
| Glass microfiber | 0.3 | 300 |
| µArray | 10 | 1000 |

ELECTROOSMOTIC HIGH FIDELITY ACOUSTIC TRANSDUCER

CROSS-REFERENCE TO RELATED APPLICATION

The present application claims priority under 35 U.S.C. § 119(e) of U.S. Provisional Patent Application Ser. No. 62/732,164, filed Sep. 17, 2018, the disclosure of which is incorporated by reference herein.

STATEMENT OF GOVERNMENT LICENSE RIGHTS

This invention was made with government support under N00014-11-1-0019 awarded by the U.S. Department of Defense, Office of Naval Research. The Government has certain rights in the invention.

TECHNICAL FIELD

The present disclosure relates to the field of sound transducers, and more particularly, to electroosmotic acoustic transducer for the projection and sensing (as hydrophone) of acoustic waves (i.e., audible or inaudible) or sound in fluid.

BACKGROUND

Sound is a pressure wave that is created by a vibrating object. Existing sound transducers produce sound via a vibrating solid boundary. Such conventional sound transducers are disadvantageous as they typically require a number of moving parts, have high maintenance costs, are expensive, bulky, large and non-compact, are prone to accelerated degradation from local cavitation effects when used at high power, have limited industry applications, and are not environmentally friendly. Additionally, traditional underwater transduction devices are limited in their ability to be flexible, conformal, acoustically transparent, broadband projection and sensing, and individually operable on a micro-scale.

It would thus be desirable to have an improved transducer for projecting and sensing acoustic waves for various industry applications, among other desirable features as described herein, which avoids the disadvantages of conventional sound transduction devices.

SUMMARY

In a first aspect, there is provided herein an acoustic transducer system for projecting and sensing acoustic waves or sound in fluid, according to the present disclosure. The acoustic transducer system includes a transducer array of a plurality of channels, each channel having an inlet and an outlet, and a reservoir containing a liquid solution. A first electrode is disposed proximate to the inlet and a second electrode is disposed proximate to the outlet. A voltage source is connected to the first and second electrodes and is configured to apply a voltage across a length of the array of the plurality of channels to generate an electric field parallel to each channel. The electric field causes an electroosmotic flow of ions from the reservoir to the outlet producing a plurality of acoustic waves or sound at the outlet.

In certain embodiments, the plurality of channels are configured in size as nanochannels or microchannels ranging from 10 nm to 100 μm.

In certain embodiments, the transducer array of the plurality of channels comprises at least two channels or greater than one million individual channels.

In certain embodiments, the transducer array is configured with spacing proportional to the size of the plurality of channels down to one-tenth the size thereof.

In certain embodiments, the acoustic transducer system is configured to generate a plurality of signals with a frequency from less than one Hertz to greater than 100 MHz.

In certain embodiments, the electric field is 100 volts per meter to 70 million volts per meter.

In certain embodiments, each channel has a length of 15 nm to 5 cm.

In certain embodiments, the plurality of channels have a combination of independent lengths.

In certain embodiments, the transducer array is conformally applied to match different curvatures of a surface.

In certain embodiments, each channel has a diameter of 10 nm to 100 μm.

In certain embodiments, the plurality of channels have a combination of independent diameters.

In certain embodiments, the liquid solution comprises at least one of an aqueous solution, alcohol, hydrocarbons, and carbonates.

In certain embodiments, the transducer array of the plurality of channels includes at least one of a porous frit, micro-capillary array (MCA), anodic alumina wafer, track etched polymer, glass fiber filter, micro-electro-mechanical systems (MEMS) fabricated micro-channel array, or other porous non-conducting material.

In certain embodiments, the acoustic transducer system is configured to operate while submerged in high-pressure environments such as the deep sea.

In certain embodiments, the acoustic transducer system forms a sound transducer for at least one of audio speakers, headphones, ultrasonic speakers, medical diagnostic and therapeutic (ultrasonic) devices, compact ultra-low frequency signaling, deep sea signaling, directional signal beams, military aquatic cloaking, and sensing.

In certain embodiments, the acoustic transducer system is exposed or isolated from environment by a flexible or rigid structure.

In certain embodiments, the plurality of channels are configured to be acoustically transparent.

In a second aspect, there is provided herein a method for projecting and sensing acoustic waves or sound in fluid using an acoustic transducer, according to the present disclosure. The method includes the following steps: providing a transducer array of a plurality of channels; applying a voltage between a first electrode disposed proximate to an inlet of each channel and a second electrode disposed proximate to an outlet of each channel to generate an electric field that is parallel to each channel; introducing a solution into the channel from a reservoir connected to the inlet of the channel, wherein ions in the solution form an electric double layer along walls of the channel; and varying a concentration of the solution and the voltage to cause an electro-osmotic flow of ions from the inlet to the outlet to produce a plurality of acoustic waves or sound at the outlet.

In certain embodiments, the method further includes the step of generating a plurality of signals with a frequency from less than one Hertz to greater than 100 MHz.

In certain embodiments, the method further includes the step of providing at least one of a porous frit, micro-capillary array (MCA), anodic alumina wafer, track etched polymer, glass fiber filter, micro-electro-mechanical systems (MEMS) fabricated micro-channel array, or other porous non-conducting material.

Various advantages of this disclosure will become apparent to those skilled in the art from the following detailed description, when read in light of the accompanying drawings.

DETAILED DESCRIPTION

Figure 1:
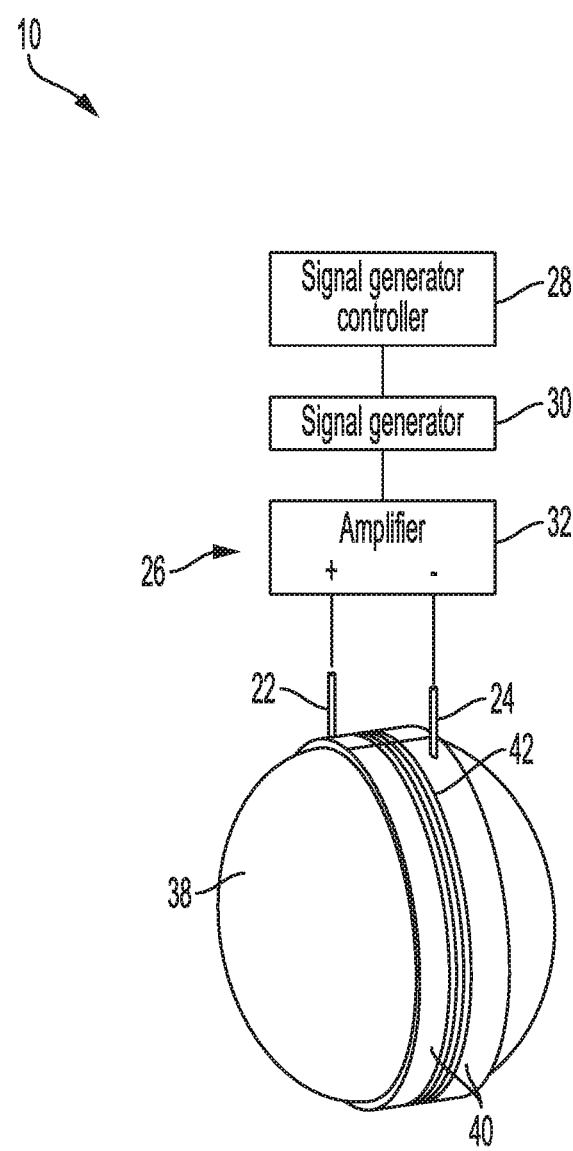
FIG. 1 is an exterior perspective view of an electroosmotic transducer of the acoustic transducer system in accordance with an example embodiment of the present disclosure.
Figure 2:
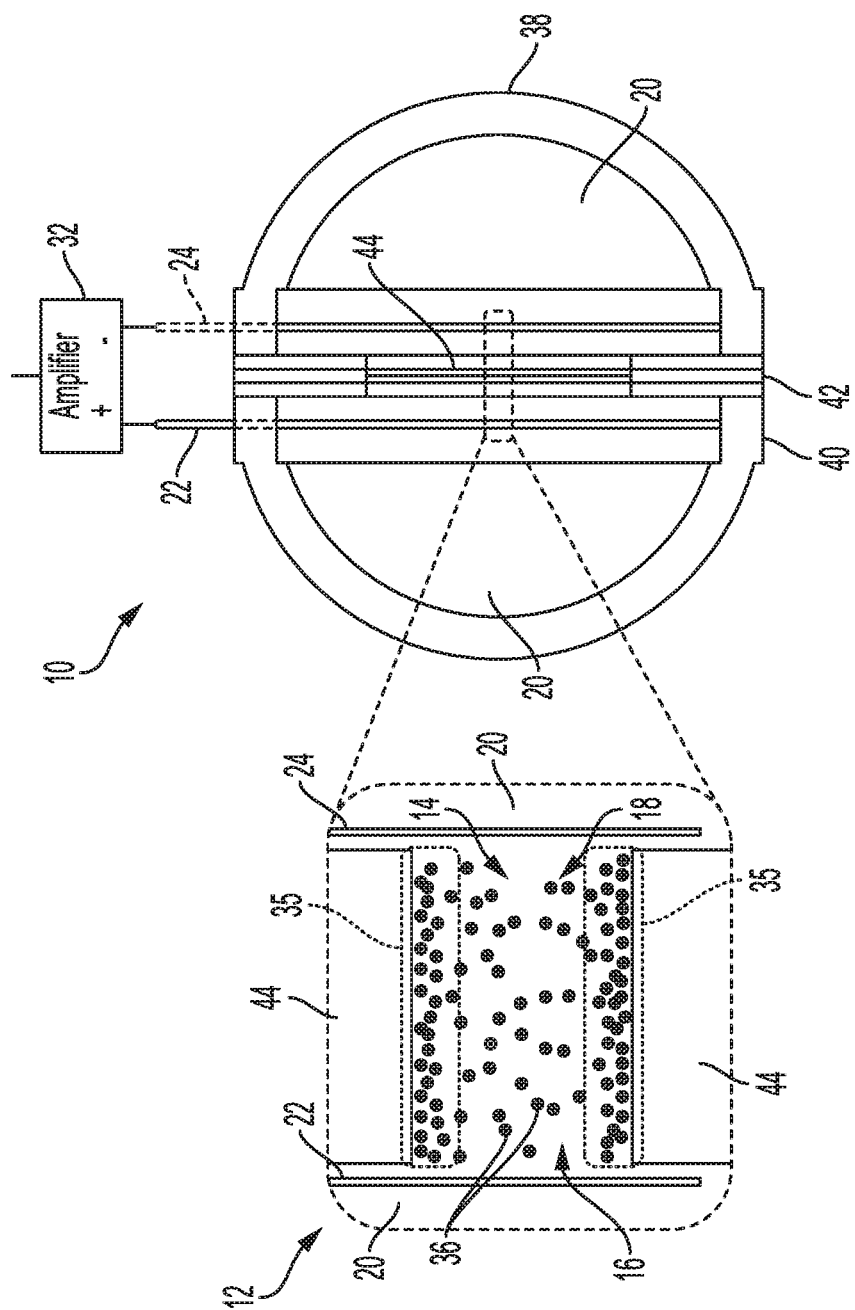
FIG. 2 is a cross-section view of the electroosmotic transducer of FIG. 1 with an enlarged, close up view of the electroosmotic channel cross-section of the acoustic transducer system in accordance with an example embodiment of the present disclosure.
Figure 3:
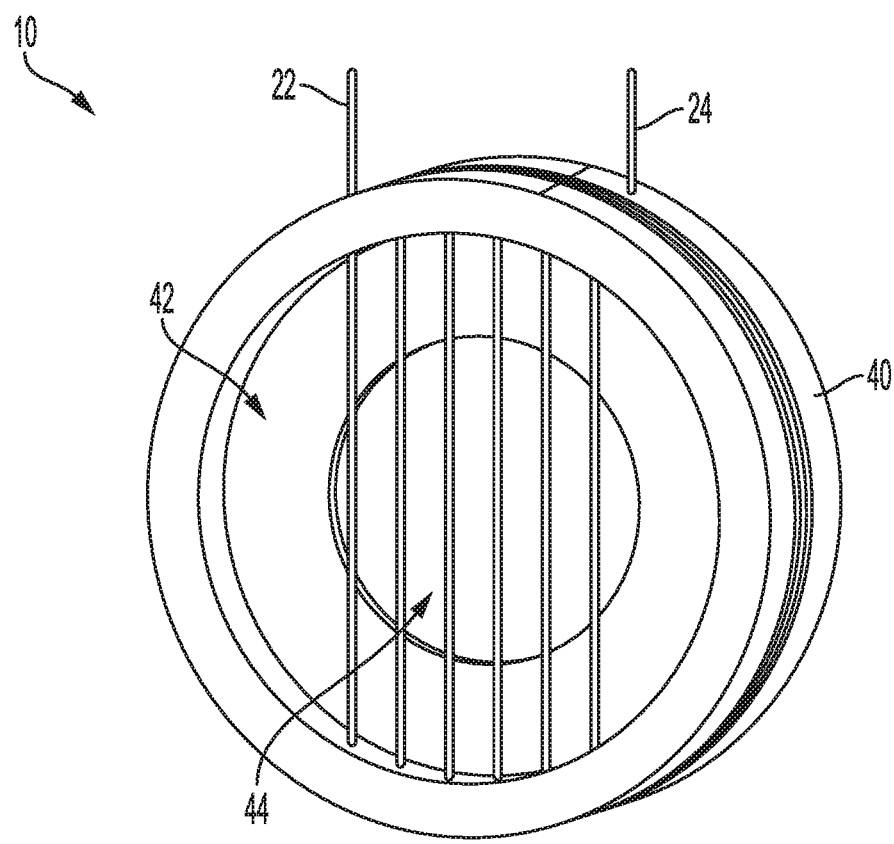
FIG. 3 is an interior, front perspective view of the electroosmotic transducer of FIG. 1 shown with the exterior housing removed in accordance with an example embodiment of the present disclosure.
Figure 4:
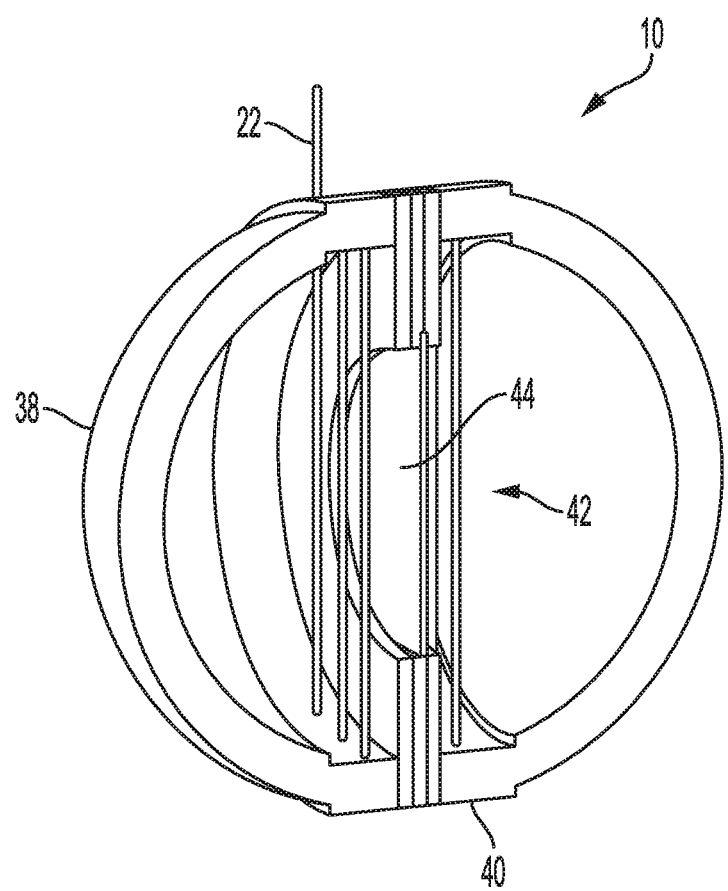
FIG. 4 is an interior, side perspective view of the electroosmotic transducer of FIG. 1 shown with the exterior housing partially removed to illustrate the placement of the electroosmotic transduction material in accordance with an example embodiment of the present disclosure.
Figure 5:
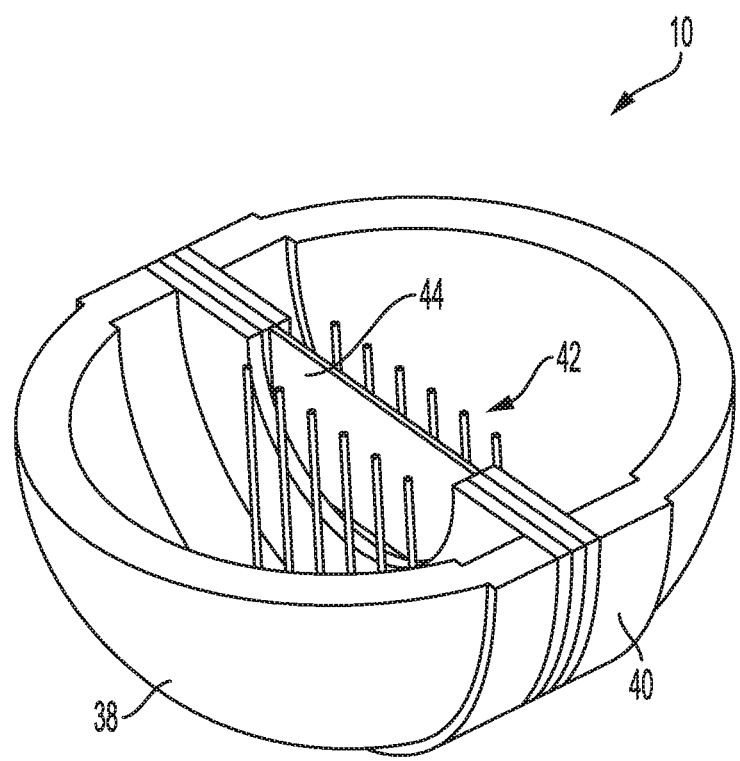
FIG. 5 is an interior, top perspective view of an alternative embodiment of the electroosmotic transducer of FIG. 1 shown with the exterior housing partially removed to illustrate the placement of the electroosmotic transduction material in accordance with the present disclosure.

This disclosure is not limited to the particular apparatus, systems, methodologies or protocols described, as these may vary. The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All sizes recited in this document are by way of example only, and the disclosure is not limited to structures having the specific sizes or dimensions recited below. As used herein, the term "comprising" means "including, but not limited to." As further used herein, the terms "electroosmotic transducer," "acoustic or sound transducer," and "transducer array" are used interchangeably and mean the same thing.

In consideration of the figures, it is to be understood for purposes of clarity that certain details of construction and/or operation are not provided in view of such details being conventional and well within the skill of the art upon disclosure of the document described herein.

Electrokinetic phenomena are currently an active area of research in fields such as biology, electronic design, and the like and may be well suited for pumping liquids in micro- and nano-scale devices. One of the significant and technologically promising phenomena in the field of electrokinetics is electroosmosis, where a fluid moves through a non-conductive micro- or nano-channel under an applied electric field. Recent studies demonstrate the potential for using the electrokinetic effect as a mechanism to efficiently convert mechanical work into electrical energy. The present disclosure bridges the gap between the established fields of micro- and nano-fluidic electrokinetics and sound to provide the basis for a new class of sound transducers with applications in various industries.

The present disclosure pertains to an acoustic transducer system and a method for projecting and sensing acoustic waves or sound in fluid. The accepted definition of "sound" requires a vibrating object, membrane or surface. The acoustic transducer of the present disclosure is a type of sound generating device that operates without the use of a moving solid object, membrane or surface. The acoustic transducer disclosed herein creates acoustic waves or sound in fluid directly by harnessing the versatile frequency response of the electroosmotic effect. Signals with a frequency from below one Hertz to above 100 MHz can be generated. The transducer array, which is composed of any number of individual micrometer or nanometer diameter transducers, can be fabricated with spacing of less than 500 nm, allowing for unprecedented control over pressure wave structure. The lack of moving parts and form factor versatility of the transducer array may aid to reduce local cavitation effects.

Some key advantages of the acoustic transducer of the present disclosure include as follows: (1) electroosmotic flows are linearly dependent on the electric field applied (i.e., intensity should be linear with the electric field); (2) nanoscale array resolution (for directional beams); (3) electrokinetic nano actuators allow for a large number of individually addressable micros or they can be grouped into clusters; (4) can generate high frequencies (e.g., 10 MHz); (5) can produce high pressures (10,000 psi is achievable with micron-size channels); (6) can be scaled up or down; and (7) very robust and reliable technology with no moving parts.

In addition to the advantages described above, the acoustic transducer or electroosmotic transducer can operate while submerged in high-pressure environments such as the deep sea. Various applications of the acoustic transducer of the present disclosure include audio speakers, headphones, ultrasonic speakers, medical diagnostic and therapeutic (ultrasonic) devices, compact ultra-low frequency signaling, deep sea signaling, directional signal beams, military aquatic cloaking, and sensing.

Electroosmotic flow (EOF) is the motion of liquid induced by an applied potential across a porous material, capillary tube, membrane, micro-channel, or any other fluid conduit. EOF is most significant when in small channels and is an essential component in existing chemical separation techniques, notably capillary electrophoresis. Application of an electric field across the length of the channel induces flow through the channel. Electroosmosis enables efficient fluid pumping using electric fields, and has been extensively used in microfluidics. In electroosmotic driven flows, a typical simplification shows that the velocity is proportional to the electric field:

$$U \approx \Omega E_z, Q \approx \pi R^2 \Omega E_z$$

Referring now to FIGS. 1-5, the acoustic transducer system 10 will be described in further detail. The acoustic transducer system 10 generally includes a transducer array 12 of a plurality of channels 14, each channel 14 having an inlet 16 and an outlet 18, and a reservoir 20 containing a liquid solution. A first electrode 22 is disposed proximate to the inlet 16 and a second electrode 24 is disposed proximate to the outlet 18. A voltage source 26, including a signal generator controller 28 for an acoustic signal, a signal generator 30, and an amplifier 32 for creating the electric field from the acoustic signal, is connected to the first and second electrodes 22, 24 and is configured to apply a voltage across a length of the array 12 of the plurality of channels 14 to generate an electric field 34 parallel to each channel 14. An electric double layer (EDL) 35 exists inside the plurality of channels 14 due to natural charge buildup that occurs at the solid-fluid interface inside the channel when the solid is non-conducting and the liquid is a dilute ionic solution. There are two layers in the EDL as the name suggests. The first layer, known as the Stern or stationary layer, refers to the fluid that is held very tightly to the solid by natural coulomb attraction between the dilute ionic solution and non-conducting wall. The second layer, known as the diffuse layer, consists of the remaining charge buildup between the stern layer and the rest of the bulk fluid. The diffuse layer is loosely attracted by the solid and therefore it can be mobilized. The electric field generated by voltage 26 (FIG. 7) causes a coulomb force on the EDL therefore mobilizing the EDL layer 34. This mobilized layer viscously drags the solution in the channel 14 from the reservoir 20 to the outlet 18 producing a plurality of acoustic waves at the outlet 18. High power alternating frequency or pulsing is used for projecting and sensing the plurality of acoustic waves or sound in fluid.

In some embodiments, the acoustic transducer system 10 is exposed or isolated from the environment by a flexible or rigid structure, such as an exterior housing 38, and includes a housing component 40 disposed therebetween the exterior housing 38. As shown in the illustrated embodiments, the exterior housing 38 for the electroosmotic transducer 12 is spherical. It should be understood that the exterior housing 38 and housing component 40 can be configured of any suitable shape and is not limited to the spherical configuration as illustrated in the drawings.

In accordance with the present disclosure, the exterior housing 38 and the housing component 40 may be fabricated from any suitable acoustically transparent material, such as polyurethane, rubber and the like.

In further accordance with the present disclosure, the electroosmotic transducer 12 includes an electroosmotic material mounting section 42 disposed therein for receiving the electroosmotic transduction material (walls of channels) 44. In some embodiments, the transducer array 12 of the plurality of channels 14 includes at least one of a porous frit, micro-capillary array (MCA), anodic alumina wafer, track etched polymer, glass fiber filter, micro-electro-mechanical systems (MEMS) fabricated micro-channel array, or any other suitable porous non-conducting material.

In other embodiments, the plurality of channels 14 are configured to be fabricated from an acoustically transparent material. In particular, the electroosmotic transduction material (walls of channels) 44 is made from a suitable acoustically transparent material, such as polyurethane, rubber and the like. It should be understood that coatings may be used on the electroosmotic transduction material to increase performance, but the coatings themselves would be so thin such that they would also be considered acoustically transparent.

In some embodiments, the plurality of channels 14 are configured in size as nanochannels or microchannels ranging from 10 nm to 100 µm.

In other embodiments, the transducer array 12 of the plurality of channels 14 comprises at least two channels or greater than one million individual channels (not shown).

In some embodiments, the transducer array 12 is configured with spacing proportional to the size of the plurality of channels 14 down to one-tenth the size thereof.

In further embodiments, the acoustic transducer system 10 is configured to generate a plurality of signals with a frequency from less than one Hertz to greater than 100 MHz.

In some embodiments, the electric field 34 is 100 volts per meter to 70 million volts per meter.

In other embodiments, each channel 14 has a length of 15 nm to 5 cm.

In further embodiments, the plurality of channels 14 may have a combination of independent lengths.

In some embodiments, each channel 14 has a diameter of 10 nm to 100 µm.

In other embodiments, the plurality of channels 14 have a combination of independent diameters.

It should be understood that the various components of the acoustic transducer system are not limited to the sizes, shapes and dimensions disclosed herein as the acoustic transducer system can be sized to scale up or down as needed.

In further embodiments, the liquid solution comprises at least one of an aqueous solution, alcohol, hydrocarbons, and carbonates.

In other embodiments, the acoustic transducer system 10 is configured to operate while submerged in high-pressure environments such as the deep sea (not shown).

In further embodiments, the acoustic transducer system 10 forms a sound transducer for at least one of audio speakers, headphones, ultrasonic speakers, medical diagnostic and therapeutic (ultrasonic) devices, compact ultra-low frequency signaling, deep sea signaling, directional signal beams, military aquatic cloaking, and sensing (not shown).

Figure 6:
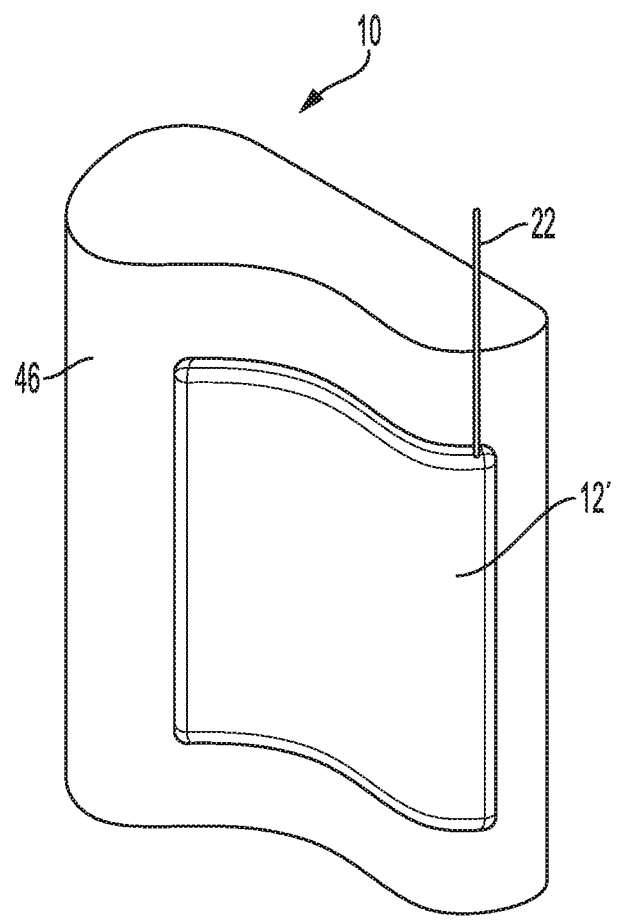
FIG. 6 is a perspective view of an alternative embodiment of the electroosmotic transducer of the acoustic transducer system shown conformally applied to a non-planar surface in accordance with the present disclosure.

In accordance with the present disclosure, the transducer array 12 can be conformally applied to match different curvatures of a surface. For example, the transducer array can be applied to the exterior surface of a ship or submarine such that the sea-going vessels effectively function as an enormous speaker. FIG. 6 is a perspective view of an alternative embodiment of the electroosmotic transducer 12' of the acoustic transducer system 10 shown conformally applied to a non-planar surface 46. It should be understood that the electroosmotic transducer 12 can be configured to be applied to any suitable surface and is not limited to a non-planar surface as illustrated in the drawing.

Figure 7:
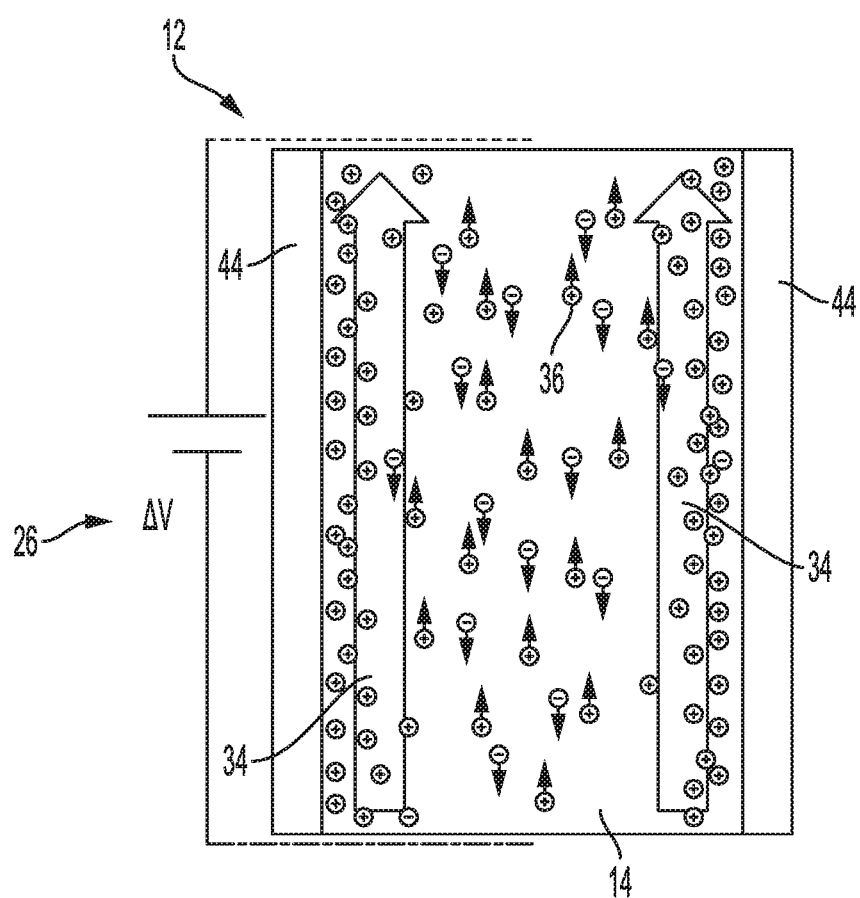
FIG. 7 is a schematic diagram showing the application of an electric field across the length of a channel inducing flow through the channel in accordance with an example embodiment of the present disclosure.

FIG. 7 is a schematic diagram showing the application of an electric field 34 across the length of a channel 14 inducing flow through the channel 14 in accordance with the present disclosure.

Figure 8:
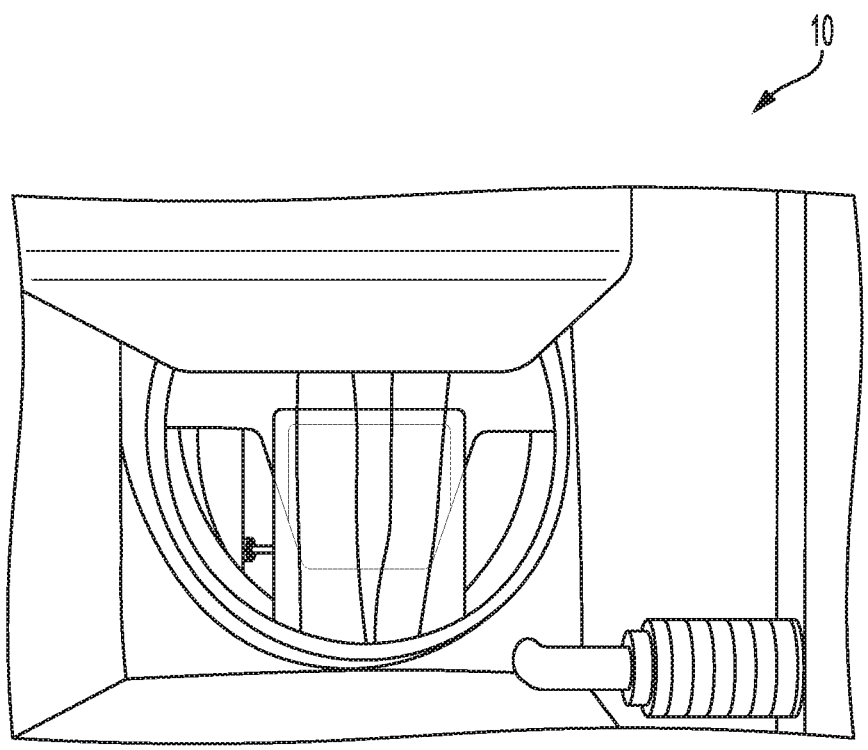
FIG. 8 is a front view of an experimental setup demonstrating electroosmotic acoustics in accordance with an example embodiment of the present disclosure.
Figure 9:
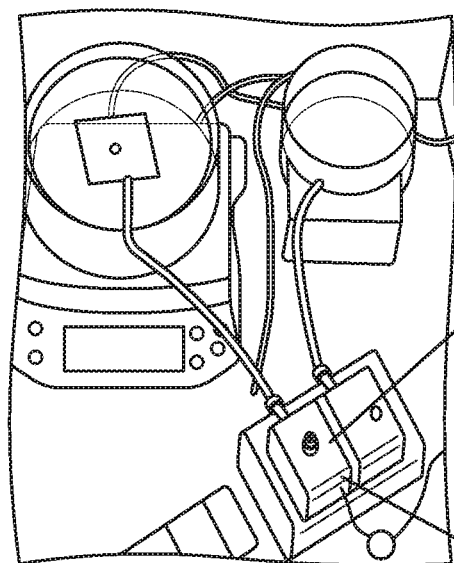
FIG. 9 is a photograph of a prototype testing platform for membranes showing two types of membranes (glass microfiber and glass microarray) that can be used in the acoustic transducer system in accordance with an example embodiment of the present disclosure.
Figure 9:
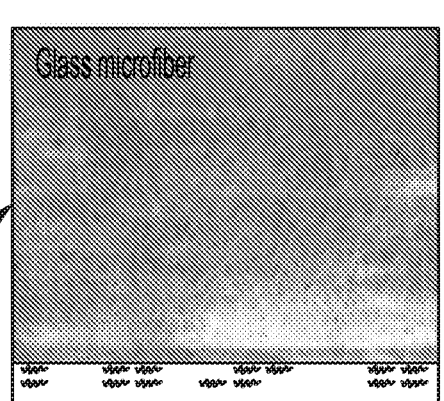
Figure 9:
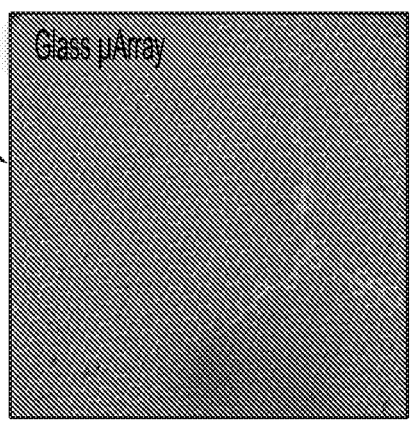

FIG. 8 is a front view of an experimental setup demonstrating electroosmotic acoustics in accordance with the acoustic transducer system 10 of the present disclosure. FIG. 9 is a photograph of a prototype testing platform for membranes showing two types of membranes (glass microfiber and glass microarray) that can be used in the acoustic transducer system 10 of the present disclosure. It should be understood that the channels can be formed from a porous material and are not necessarily straight in configuration as demonstrated by the porous glass microfiber membrane in the figure.

There is further disclosed herein a method for projecting and sensing acoustic waves or sound in fluid using the acoustic transducer system described above. The method includes the following steps: providing a transducer array of a plurality of channels; applying a voltage between a first electrode disposed proximate to an inlet of each channel and a second electrode disposed proximate to an outlet of each channel to generate an electric field that is parallel to each channel; introducing a solution into the channel from a reservoir connected to the inlet of the channel, wherein ions in the solution form an electric double layer along walls of the channel; and varying a concentration of the solution and the voltage to cause an electro-osmotic flow of ions from the inlet to the outlet to produce a plurality of acoustic waves or sound at the outlet.

In some embodiments, the method further includes the step of generating a plurality of signals with a frequency from less than one Hertz to greater than 100 MHz.

In other embodiments, the method further includes the step of providing at least one of a porous frit, micro-capillary array (MCA), anodic alumina wafer, track etched polymer, glass fiber filter, micro-electro-mechanical systems (MEMS) fabricated micro-channel array, or other porous non-conducting material for use as the electroosmotic transduction material described above.

These and other advantages of the present disclosure will be apparent to those skilled in the art. Accordingly, it will be recognized by those skilled in the art that changes or modifications may be made to the above-described embodiments without departing from the broad inventive concepts of the present disclosure. It should therefore be understood that the present disclosure is not limited to the particular embodiments described herein, but is intended to include all changes and modifications that are within the scope and spirit of the disclosure as encompassed by the disclosure and figures herein and the following claims.

What is claimed is:

1. An acoustic transducer system for projecting and sensing acoustic waves or sound in fluid, comprising:
   a transducer array of a plurality of channels, each channel having an inlet and an outlet;
   a reservoir containing a liquid solution;
   a first electrode disposed proximate to the inlet and a second electrode disposed proximate to the outlet; and
   a voltage source, connected to the first and second electrodes, configured to apply a voltage across a length of the transducer array of the plurality of channels to generate an electric field parallel to each channel, the voltage source further configured to apply an alternating or pulsed voltage across the length of the transducer array;
   wherein the electric field causes an electroosmotic flow of ions from the reservoir to the outlet producing a plurality of acoustic waves or sound at the outlet, based on osmotic flow of ions due to the alternating or pulsed voltage across the length of the transducer array.

2. The acoustic transducer system according to claim 1, wherein the plurality of channels are configured in size as nanochannels or microchannels ranging from 10 nm to 100 µm.

3. The acoustic transducer system according to claim 1, wherein the transducer array of the plurality of channels comprises at least two channels or greater than one million individual channels.

4. The acoustic transducer system according to claim 1, wherein the transducer array is configured with spacing proportional to the size of the plurality of channels down to one-tenth the size thereof.

5. The acoustic transducer system according to claim 1, wherein the voltage source is configured to provide alternating frequency or pulsing, causing the acoustic transducer system to generate a plurality of signals with a frequency from one Hertz to 100 MHz.

6. The acoustic transducer system according to claim 1, wherein the electric field is 100 volts per meter to 70 million volts per meter.

7. The acoustic transducer system according to claim 1, wherein each channel has a length of 15 nm to 5 cm.

8. The acoustic transducer system according to claim 1, wherein the plurality of channels have a combination of independent lengths.

9. The acoustic transducer system according to claim 1, wherein the transducer array is conformally applied to match different curvatures of a surface.

10. The acoustic transducer system according to claim 1, wherein each channel has a diameter of 10 nm to 100 µm.

11. The acoustic transducer system according to claim 1, wherein the plurality of channels have a combination of independent diameters.

12. The acoustic transducer system according to claim 1, wherein the liquid solution comprises at least one of an aqueous solution, alcohol, hydrocarbons, and carbonates.

13. The acoustic transducer system according to claim 1, wherein the transducer array of the plurality of channels comprises at least one of a porous frit, micro-capillary array (MCA), anodic alumina wafer, track etched polymer, glass fiber filter, micro-electro-mechanical systems (MEMS) fabricated micro-channel array, or other porous non-conducting material.

14. The acoustic transducer system according to claim 1, wherein the acoustic transducer system is configured to operate while submerged in high-pressure environments.

15. The acoustic transducer system according to claim 1, wherein the acoustic transducer system forms a sound transducer for at least one of audio speakers, headphones, ultrasonic speakers, medical diagnostic and therapeutic (ultrasonic) devices, compact ultra-low frequency signaling, deep sea signaling, directional signal beams, military aquatic cloaking, and sensing.

16. The acoustic transducer system according to claim 1, wherein the acoustic transducer system is isolated from an environment by an acoustically transparent material.

17. The acoustic transducer system according to claim 1, wherein the plurality of channels are configured to be acoustically transparent.

18. A method for projecting and sensing acoustic waves or sound in fluid using an acoustic transducer system, comprising the steps of:
   providing a transducer array of a plurality of channels;
   applying an alternating or pulsed voltage between a first electrode disposed proximate to an inlet of each channel and a second electrode disposed proximate to an outlet of each channel to generate an electric field that is parallel to each channel;

introducing a solution into each channel from a reservoir connected to the inlet of the channel, wherein ions in the solution form an electric double layer along walls of the channel; and varying a concentration of the solution and the voltage to cause an electro-osmotic flow of ions from the inlet to the outlet due to the alternating or pulsed voltage to produce a plurality of acoustic waves or sound at the outlet.

19. The method according to claim 18, wherein causing the electro-osmotic flow to produce the plurality of acoustic waves comprises:

generating a plurality of signals with a frequency from one Hertz to 100 MHz.

20. The method according to claim 18, the method further comprising the step of:

providing at least one of a porous frit, micro-capillary array (MCA), anodic alumina wafer, track etched polymer, glass fiber filter, micro-electro-mechanical systems (MEMS) fabricated micro-channel array, or other porous non-conducting material.

* * * * *